(12) United States Patent
Ito

(10) Patent No.: US 12,442,093 B2
(45) Date of Patent: Oct. 14, 2025

(54) ELECTRODE, METHOD FOR PRODUCING SAME, WATER ELECTROLYZER, AND FUEL CELL

(71) Applicant: UNIVERSITY OF TSUKUBA, Tsukuba (JP)

(72) Inventor: Yoshikazu Ito, Tsukuba (JP)

(73) Assignee: UNIVERSITY OF TSUKUBA, Tsukuba (JP)

( * ) Notice: Subject to any disclaimer, the term of this patent is extended or adjusted under 35 U.S.C. 154(b) by 237 days.

(21) Appl. No.: 18/031,124

(22) PCT Filed: Sep. 29, 2021

(86) PCT No.: PCT/JP2021/035982
§ 371 (c)(1),
(2) Date: Apr. 10, 2023

(87) PCT Pub. No.: WO2022/080142
PCT Pub. Date: Apr. 21, 2022

(65) Prior Publication Data
US 2025/0084547 A1 Mar. 13, 2025

(30) Foreign Application Priority Data

Oct. 14, 2020 (JP) ................................. 2020-173198

(51) Int. Cl.
*C25B 11/089* (2021.01)
*C25B 1/04* (2021.01)
(Continued)

(52) U.S. Cl.
CPC .............. *C25B 11/089* (2021.01); *C25B 1/04* (2013.01); *C25B 11/065* (2021.01); *C25B 13/08* (2013.01); *H01M 4/9083* (2013.01); *C22C 16/00* (2013.01)

(58) Field of Classification Search
None
See application file for complete search history.

(56) References Cited

U.S. PATENT DOCUMENTS

| 4,358,475 A | 11/1982 | Brown |
| 2009/0029221 A1* | 1/2009 | Goddard ................. H01M 4/92 556/136 |

(Continued)

FOREIGN PATENT DOCUMENTS

| CN | 106756407 A | * | 5/2017 | ............... C22C 1/02 |
| CN | 109628819 A | * | 4/2019 | |

(Continued)

OTHER PUBLICATIONS

Machine translation of Xu et al. CN 106756407 A (Year: 2017).*

(Continued)

*Primary Examiner* — Wojciech Haske
(74) *Attorney, Agent, or Firm* — Kratz, Quintos & Hanson, LLP

(57) ABSTRACT

An electrode 10 includes, as a catalyst, an alloy including three or more base metal elements, in which the three or more base metal elements are nearly equal in atomic composition proportion, and form a solid solution. Also, an electrode 12 includes: a carbon fiber; and a catalyst including a base metal, at least a part of elements of the catalyst being chemically bonded to the carbon fiber. Further, the water electrolyzer includes an anode, a cathode, and a solid polymer electrolyte membrane provided between the anode and the cathode. The anode is the electrode 10, and/or the cathode is the electrode 12.

12 Claims, 16 Drawing Sheets

(51) Int. Cl.
  *C25B 11/065* (2021.01)
  *C25B 13/08* (2006.01)
  *H01M 4/90* (2006.01)
  *C22C 16/00* (2006.01)

(56) References Cited

U.S. PATENT DOCUMENTS

| | | | |
|---|---|---|---|
| 2011/0048962 A1 | 3/2011 | Reece | |
| 2015/0349368 A1 | 12/2015 | Arges | |
| 2017/0326690 A1* | 11/2017 | Heard | B22F 10/20 |
| 2021/0214852 A1* | 7/2021 | Huang | C25B 11/057 |
| 2022/0258231 A1* | 8/2022 | Kitagawa | B01J 35/70 |

FOREIGN PATENT DOCUMENTS

| | | |
|---|---|---|
| CN | 110280255 A | 9/2019 |
| CN | 111185188 A | 5/2020 |
| DE | 102017128058 A1 | 5/2019 |
| EP | 3440238 A1 | 2/2019 |
| EP | 3440237 B1 | 9/2021 |
| JP | S55-500750 A | 10/1980 |
| JP | 2003-013271 A | 1/2003 |
| JP | 2013-503257 A | 1/2013 |
| JP | 2014-034495 A | 2/2014 |
| JP | 2019-513895 A | 5/2019 |
| JP | 2020-012171 A | 1/2020 |
| KR | 20180049808 A | 5/2018 |
| WO | 2014/025049 A1 | 2/2014 |

OTHER PUBLICATIONS

International Preliminary Report on Patentability (Chapter II) for International Application No. PCT/JP2021/035982 issued Sep. 5, 2022 (7 sheets).

"Development of base metal electrodes having corrosion resistance and high hydrogen-generating efficiency"; [Online]; Mar. 30, 2018; National University Corporation University of Tsukuba, National University Corporation Osaka University, National University Corporation Tohoku University; [searched on Sep. 16, 2020]; <URL: http://www.tsukuba.ac.jp/wp-content/uploads/180330ito-1.pdf> (8 sheets, 10 sheets translation, 18 sheets total).

T. Löffler et al.; "Discovery of a Multinary Noble Metal-Free Oxygen Reduction Catalyst"; Advanced Energy Materials; 2018; 8; 1802269; DOI: 10.1002/aenm.201802269; pp. 1-7 (7 pages).

International Search Report for International Application No. PCT/JP2021/035982 dated Dec. 14, 2021 (8 sheets, 5 sheets translation, 13 sheets total).

International Preliminary Report on Patentability (Chapter II) for International Application No. PCT/JP2021/035982 dated Sep. 5, 2022 (13 sheets).

Extended European Search Report for corresponding EP Patent Application No. 21879883.3 issued Jul. 2, 2024 (9 sheets).

* cited by examiner

ELECTRODE, METHOD FOR PRODUCING SAME, WATER ELECTROLYZER, AND FUEL CELL

TECHNICAL FIELD

The present invention relates to an electrode, a method for producing the same, a water electrolyzer, and a fuel cell.

BACKGROUND ART

Noble metals such as platinum are used as catalysts in electrodes of water electrolyzers, fuel cells, secondary batteries, and electric double layer capacitors. A base metal alloy in which a graphene film is formed on a NiMo (nickel molybdenum) alloy is known (for example, Non-Patent Literature 1). It is known that an alloy containing Cr, Mn, Fe, Co, and Ni is used as a catalyst for an oxygen reduction reaction (ORR) (for example, Non-Patent Literature 2).

CITATION LIST

Non Patent Document

Non-Patent Literature 1: "Development of base metal electrodes having corrosion resistance and high hydrogen-generating efficiency", [online], Mar. 30, 2018, National University Corporation University of Tsukuba, National University Corporation Osaka University, National University Corporation Tohoku University, [searched on Sep. 16, 2020], Internet <URL: http://www.tsukuba.ac.jp/wp-content/uploads/180330ito-1.pdf>

Non-Patent Literature 2: Adv. Energy Mater. 2018, 8, 1802269

SUMMARY OF INVENTION

Technical Problem

Noble metals are expensive, and, when used in electrodes, make devices expensive. Base metals are inexpensive, but have low chemical stability. Therefore, when a base metal is used in an electrode, the electrode cannot withstand long-term use and has low durability. When a graphene film is used as in Non-Patent Literature 1, a production cost increases. It is common general knowledge of those skilled in the art that required characteristics of the catalyst differ depending on the type of reaction, and the catalyst for ORR is not used as a catalyst for an oxygen evolution reaction (OER) or a catalyst for a hydrogen evolution reaction (HER). An overvoltage is applied to the OER catalyst for the purpose of obtaining a desired current density for progression of the OER, and the OER catalyst is exposed to a high potential, and is oxidized and easily deteriorated. Therefore, the catalyst for ORR is not usually used as the OER catalyst. Depending on the device in which the HER catalyst is used, the HER catalyst is also easily oxidized and deteriorated. Therefore, the catalyst for ORR is not usually used as the HER catalyst. Further, a catalyst for a hydrogen oxidation reaction (HOR) involves a problem of CO poisoning. Therefore, the catalyst for ORR is not usually used as the HOR catalyst.

The present invention has been made in view of the above problems, and an object thereof is to provide an electrode that is inexpensive and is improved in durability, a method for producing the same, and a water electrolyzer.

Solution to Problem

The present invention is an electrode including, as a catalyst for an oxygen evolution reaction or for a hydrogen evolution reaction, an alloy including three or more base metal elements, in which the three or more base metal elements are nearly equal in atomic composition proportion, and form a solid solution.

In the above configuration, the three or more base metal elements may be at least three elements of Fe, Cu, Ni, Al, Pb, Zn, Sn, W, Mo, Ta, Mg, Co, Bi, Cd, Ti, Zr, Sb, Mn, Be, Cr, Ge, V, Ga, Hf, In, Nb, Re and Tl.

In the above configuration, the three or more base metal elements may be five or more base metal elements.

In the above configuration, the three or more base metal elements may be six or more base metal elements.

In the above configuration, the catalyst may be a catalyst for an oxygen evolution reaction.

The present invention is an electrode including, as a catalyst for a hydrogen oxidation reaction, an alloy including three or more base metal elements, in which the three or more base metal elements are nearly equal in atomic composition proportion, and form a solid solution.

In the above configuration, the three or more base metal elements may be at least three elements of Fe, Cu, Ni, Al, Pb, Zn, Sn, W, Mo, Ta, Mg, Co, Bi, Cd, Ti. Zr, Sb, Mn, Be, Cr, Ge, V, Ga, Hf, In, Nb, Re and Tl.

In the above configuration, the three or more base metal elements may be five or more base metal elements.

In the above configuration, the three or more base metal elements may be six or more base metal elements.

The present invention is an electrode including: a carbon fiber; and a catalyst including a base metal, at least a part of elements of the catalyst being chemically bonded to the carbon fiber.

In the above configuration, the catalyst may be an alloy including at least two elements of Cr, Mn, Fe, Co, Ni and Mo.

In the above configuration, the catalyst may be a NiMo alloy.

The present invention is a water electrolyzer including: an anode which is an electrode including, as a catalyst for an oxygen evolution reaction or for a hydrogen evolution reaction, an alloy including three or more base metal elements, in which the three or more base metal elements are nearly equal in atomic composition proportion, and form a solid solution; a cathode; and a solid polymer electrolyte membrane provided between the anode and the cathode.

In the above configuration, the cathode may be an electrode including, as a catalyst for an oxygen evolution reaction or for a hydrogen evolution reaction, an alloy including three or more base metal elements, in which the three or more base metal elements are nearly equal in atomic composition proportion, and form a solid solution.

In the above configuration, the cathode may be an electrode including: a carbon fiber; and a catalyst including a base metal, at least a part of elements of the catalyst being chemically bonded to the carbon fiber.

In the above configuration, the anode may be an electrode including, as a catalyst, an alloy including at least five elements of Fe, Cu, Ni, Al, Pb, Zn, Sn, W, Mo, Ta, Mg, Co, Bi, Cd, Ti, Zr, Sb, Mn, Be, Cr, Ge, V, Ga, Hf, In, Nb, Re and Tl, in which the at least five elements are nearly equal in atomic composition proportion, and form a solid solution.

The present invention is a water electrolyzer including: an anode; a cathode which is an electrode including a carbon fiber, and a catalyst including a base metal, at least a part of elements of the catalyst being chemically bonded to the carbon fiber; and a solid polymer electrolyte membrane provided between the anode and the cathode.

The present invention is a fuel cell including: an anode which is an electrode including, as a catalyst for a hydrogen oxidation reaction, an alloy including three or more base metal elements, in which the three or more base metal elements are nearly equal in atomic composition proportion, and form a solid solution; a cathode; and an electrolyte membrane provided between the anode and the cathode.

The present invention is a method for producing an electrode, including: attaching an oxide of a base metal onto a surface of a carbon fiber; and forming a catalyst chemically bonded to the carbon fiber and containing a base metal by thermally treating the carbon fiber in a reducing gas atmosphere.

In the above configuration, the attaching an oxide may include placing the carbon fiber in an aqueous solution containing a plurality of base metals and attaching oxides of the plurality of base metals onto the surface of the carbon fiber by using a hydrothermal synthesis method, and the forming a catalyst may include forming an alloy of the plurality of base metals.

Advantageous Effects of Invention

The present invention can provide an electrode that is inexpensive and is improved in durability, a method for producing the same, and a water electrolyzer.

DESCRIPTION OF EMBODIMENTS

Figure 1:
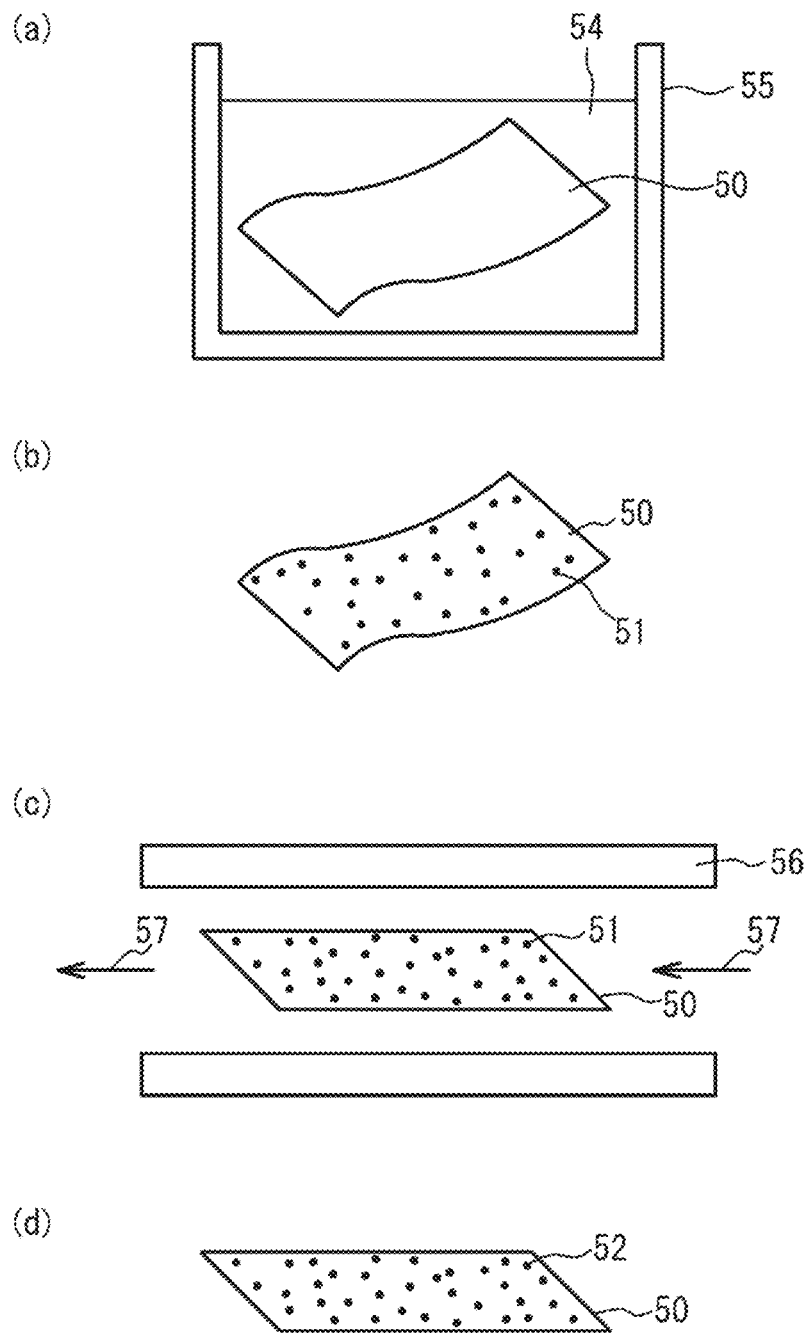
FIGS. 1A to 1D are schematic views illustrating a method for producing an electrode according to Embodiment 2.

Embodiments according to the present invention will be described below.

Embodiment 1

Base metals are metals having a lower ionization tendency than hydrogen, and are inexpensive. Therefore, the use of a base metal as a catalyst for an electrode has been studied. Cu has a higher ionization tendency than hydrogen but is inexpensive, and thus is included in the base metal in the present specification. In Embodiment 1, as a catalyst using a base metal and having high durability, attention was paid to a high entropy alloy. The high entropy alloy is a solid solution in which entropy of mixing is increased by making atomic compositions of five or more constituent elements substantially the same. The solid solution is a state in which constituent elements are mutually dissolved and form a uniform solid phase as a whole, and is a structure having one crystal structure such as a face centered cubic (FCC) structure or a body centered cubic (BCC) structure.

The high entropy alloy has high strength. The use of the high entropy alloy in an electrode can be expected to improve durability. From the perspective of increasing the entropy, the entropy can be increased if three or more, though not five or more, base metal elements are used as constituent elements.

In view of the above, the electrode according to Embodiment 1 includes a catalyst including an alloy containing three or more base metal elements, in which the three or more base metal elements are nearly equal in atomic composition proportion, and form a solid solution. Thus, an electrode having high durability can be provided by using inexpensive base metals.

The sentence that "the three or more base metal elements are nearly equal in atomic composition proportion" means that the composition rates of the elements have only to be equal to each other to an extent that the entropy is high, and that a difference at a level of a production error is allowed. For example, when the atomic composition proportion of the element having the highest atomic composition proportion among the three or more base metal elements is Cmax and the atomic composition proportion of the element having the lowest atomic composition proportion is Cmin, (Cmax−Cmin)/(Cmax+Cmin)≤0.2, and preferably (Cmax−Cmin)/(Cmax+Cmin)≤0.1.

Examples of the base metal element include chromium (Cr), manganese (Mn), iron (Fe), cobalt (Co), nickel (Ni), molybdenum (Mo), zirconium (Zr), titanium (Ti), niobium (Nb), zinc (Zn), aluminum (Al), copper (Cu), antimony (Sb), beryllium (Be), bismuth (Bi), cadmium (Cd), gallium (Ga), germanium (Ge), hafnium (Hf), indium (In), lead (Pb), magnesium (Mg), rhenium (Re), tantalum (Ta), thallium (Tl), tin (Sn), tungsten (W), vanadium (V), scandium (Sc), yttrium (Y), and lanthanoid.

The three or more base metal elements preferably include at least three elements of Cr, Mn, Fe, Co, Ni, Mo, Zr, Ti, Nb, Zn, Al, and Cu as base metal elements that facilitate preparation of the alloy.

From the perspective of increasing the entropy of the alloy, the number of base metal elements contained in the alloy is preferably 4 or more, and more preferably 5 or more. From the perspective of functioning as a catalyst and increasing the entropy of the alloy, the five or more base metal elements preferably include at least five elements of Cr, Mn, Fe, Co, Ni, and Mo.

The alloy containing the three or more base metals may be supported on carbon such as carbon black or carbon fiber. The alloy is preferably a porous body. This improves the catalytic performance of the alloy and the electrode performance. An average size of pores is, for example, from 1 nm to 100 µm, and an average size of ligaments is, for example, from 1 nm to 100 µm. The porous body is formed using, for example, a dealloying method.

Embodiment 2

In Non-Patent Literature 1, corrosion of a NiMo alloy caused by an electrolyte can be suppressed by covering the NiMo alloy with a graphene film. However, a production cost for forming the graphene film is required. In addition, since the graphene film prevents movement of ions such as protons in the electrolyte, the electrode characteristics deteriorate.

In Embodiment 2, the electrode includes: a carbon fiber; and a catalyst containing a base metal, at least a part of elements of the catalyst being chemically bonded to the carbon fiber. Further, the electrode includes: a carbon fiber; and a catalyst including a base metal, at least a part of elements of the catalyst being chemically bonded to the carbon fiber. Since at least some elements of the catalyst are chemically bonded to the carbon fiber as described above, contact resistance between the carbon fiber and the catalyst is low and the electrode performance is improved. Further, since the catalyst is firmly bonded to the carbon fiber, the durability of the electrode is improved. Furthermore, since it is unnecessary to form a graphene film, the production cost can be reduced. Furthermore, since it is unnecessary to use a graphene film that prevents the movement of ions in the electrolyte, the electrode performance can be further improved.

The carbon fiber is a fiber obtained by heating and carbonizing an organic fiber, and is a fiber, 90% of which (mass ratio) includes carbon. The carbon fiber has a diameter of, for example, from 0.1 µm to 100 µm, and preferably from 1 µm to 20 µm. The carbon fiber may be a carbon cloth obtained by spinning and weaving a plurality of carbon fibers or a carbon paper obtained by forming a plurality of carbon fibers into a paper shape. From the perspective of improving permeability of a liquid such as water or an electrolyte, a porosity of the carbon cloth or carbon paper is preferably 50% or greater, and more preferably 70% or greater.

The catalyst containing a base metal is an alloy containing at least two of Cr, Mn, Fe, Co, Ni, Mo, Zr, Ti, Nb, Zn, Al, Cu, Sb, Be, Bi, Cd, Ga, Ge, Hf, In, Pb, Mg, Re, Ta, Tl, Sn, W, V, Se (selenium), Te (tellurium), Si (silicon), P (phosphorus), Sc, Y and lanthanoid, or a compound of these base metals (for example, a carbide, a nitride, a sulfide, a selenium compound, a tellurium compound, or a chalcogenide-based alloy). The carbide is, for example, TiC, ZrC, VC, NbC, TaC, MoC, WC, $V_2C$, $Ta_2C$, $Mo_2C$, $W_2C$, $Mn_3C$, $Te_3C$, $Co_3C$, $Ni_3C$, or $Cr_3C_2$. The nitride is, for example, $Si_3N_4$, $Ge_3N_4$, GaN, $P_2N_3$, TiN, ZrN, NbN, TaN, $Cr_2N$, CrN, VN, $V_2N$, $Mn_2N$, $Mn_3N$, $Mn_4N$, $Mn_6N$, FeN, $Fe_2N$, $Fe_3N$, $Fe_4N$, CoN, $Co_2N$, $Co_3N$, $Co_4N$, $Ni_2N$, $Ni_3N$, $Ni_4N$, $Cu_3N$, $Zn_3N_2$, MoN, $Mo_2N$, InN, $Sn_3N_4$, or $Sn_3N_2$.

The sulfide is, for example, a chalcogenide-based layered material, such as $MoS_2$, $WS_2$, $ReS_2$, $SnS_2$, $SeS_2$, $ZrS_2$, $NiS_2$, $HfS_2$, $PdS_2$, $TaS_2$, $TiS_2$, $VS_2$, or $NbS_2$. The selenium compound is, for example, a chalcogenide-based layered material, such as $MoSe_2$, $WSe_2$, $ReSe_2$, $SnSe_2$, $ZrSe_2$, $NiSe_2$, $HfSe_2$, $PdSe_2$, $TaSe_2$, $TiSe_2$, $VSe_2$, or $NbSe_2$. The tellurium compound is, for example, a chalcogenide-based layered material, such as $MoTe_2$, $WTe_2$, $ReTe_2$, $SnTe_2$, $SeTe_2$, $ZrTe_2$, $NiTe_2$, $HfTe_2$, $PdTe_2$, $TaTe_2$, $TiTe_2$, $VTe_2$, or $NbTe_2$. In the chalcogenide-based alloy, two or more metal elements other than S, Se, and Te are mixed, or two or more of S, Se, and Te are mixed. For example, the chalcogenide-based alloy is $MoWS_2$, $MoWSe_2$, MoWSeS, or SnSeS.

In order to improve the performance as the catalyst, the catalyst containing a base metal preferably contains at least one element of Cr, Mn, Fe, Co, Ni or Mo. The catalyst is preferably an alloy containing at least two elements of Cr, Mn, Fe, Co, Ni, and Mo. Furthermore, the catalyst is preferably an alloy including at least two elements of Cr, Mn, Fe, Co, Ni, and Mo. Furthermore, the catalyst is preferably a NiMo alloy.

For a composition ratio of the NiMo alloy, for example, Ni:Mo is from 2:1 to 1:2 (atomic ratio). The NiMo alloy is preferably a porous body. This improves the catalytic performance and the electrode performance. An average size of pores of the porous body is, for example, from 1 nm to 100 nµm, and an average size of ligaments is, for example, from 1 nm to 100 µm.

FIGS. 1A to 1D are schematic views illustrating a method for producing an electrode according to Embodiment 2. As illustrated in FIG. 1A, a carbon fiber 50 such as a carbon cloth or a carbon paper is immersed in an aqueous solution 54 of a compound containing a base metal in a container 55. The compound containing the base metal is, for example, nickel chloride hexahydrate $NiCl_2 \cdot 6H_2O$, and the compound containing Mo is, for example, sodium molybdate $Na_2MoO_4 \cdot 2H_2O$. An oxide of the base metal is generated from the compound containing the base metal by using a hydrothermal synthesis method.

As illustrated in FIG. 1B, the carbon fiber 50 is impregnated with an oxide 51 of a base metal. The oxide 51 is, for example, $NiMoO_4$. As illustrated in FIG. 1C, the carbon fiber 50 impregnated with the oxide 51 is placed in a tubular furnace 56. The carbon fiber 50 is thermally treated in an atmosphere of a reducing gas 57. The reducing gas 57 is, for example, hydrogen gas or a mixed gas of hydrogen gas and an inert gas such as a rare gas. As illustrated in FIG. 1D, the oxide 51 of the base metal is reduced, and a catalyst 52 containing the base metal is directly bonded to the carbon fiber 50. The catalyst 52 is, for example, a NiMo alloy. Not only is the catalyst 52 physically bonded to the carbon fiber 50, but at least some elements of the catalyst 52 are chemically bonded to carbon of the carbon fiber 50.

As illustrated in FIGS. 1A and 1B, the oxide 51 of the base metal is attached to surfaces of a plurality of carbon fibers 50. Thereafter, as illustrated in FIGS. 1C and 1D, the carbon fiber 50 is thermally treated in the reducing gas atmosphere, and thus the catalyst 52 containing the base metal, at least a part of elements of the catalyst 52 being chemically and directly bonded to the carbon fiber 50. In the electrode thus produced, the catalyst 52 is firmly fixed to the carbon fiber 50, and thus the performance and durability of the electrode are improved.

In FIG. 1A, in the attachment of the oxide 51, the carbon fiber 50 is placed in an aqueous solution 54 containing a plurality of base metals, and oxides of the plurality of base metals are attached onto the surface of the carbon fiber 50 by using a hydrothermal synthesis method. An alloy of the plurality of base metals is formed by thermal treatment in a reducing gas atmosphere. This can form an electrode having excellent performance and durability. In the attachment of the oxide 51 onto the surfaces of the plurality of carbon fibers 50, the surfaces of the carbon fibers 50 are preferably impregnated with the oxide 51. The impregnation means that the oxide 51 is impregnated deeply into the structures of the plurality of carbon fibers.

Embodiment 3

Figure 2:
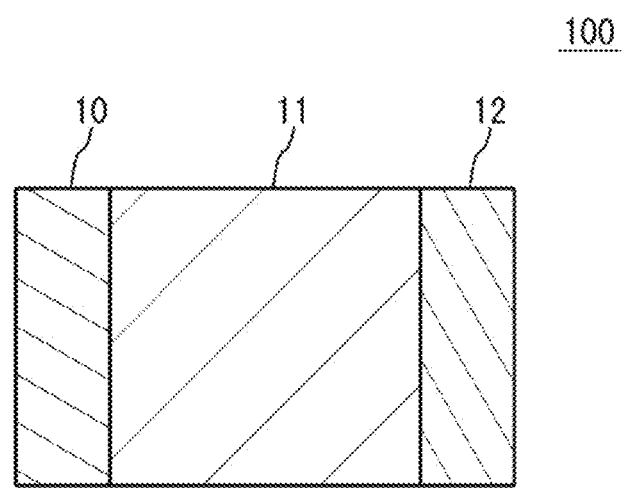
FIG. 2 is a cross-sectional view of a device according to Embodiment 3.

Embodiment 3 is examples of a water electrolyzer, a fuel cell, a secondary battery, and an electric double layer capacitor using the electrodes of Embodiments 1 and 2. FIG. 2 is a cross-sectional view of a device according to Embodiment 3. As illustrated in FIG. 2, a device 100 such as a water electrolyzer, a fuel cell, a secondary battery, or an electric double layer capacitor includes electrodes 10 and 12, and an electrolyte 11 provided between the electrodes 10 and 12. The electrodes 10 and 12 are, for example, an anode and a cathode. The electrodes of Embodiments 1 and 2 are used as at least one of the electrodes 10 and 12. This improves the durability of the electrodes 10 and 12. Further, an inexpensive device can be provided by using a base metal.

Embodiment 4

Embodiment 4 is an example of a solid polymer electrolyte membrane (PEM) water electrolyzer using the electrodes of Embodiments 1 and 2. Water electrolysis in which water is electrolyzed has attracted attention because hydrogen gas $H_2$ can be generated without discharge of $CO_2$. As a water electrolysis method, an alkaline water electrolysis method and a PEM type water electrolysis method are known. The alkaline water electrolysis method is a method using an alkaline aqueous solution. In the alkaline water electrolysis method, a base metal electrode can be used, but there are problems of low energy efficiency and generation of a harmful alkaline waste liquid. The PEM type water electrolysis method is a method of generating hydrogen gas from protons according to a reaction formula of $2H^+ + 2e^- \rightarrow H_2$ using a solid polymer electrolyte. The PEM type water electrolysis method has high energy efficiency and generates no alkaline waste liquid. However, when a base metal is used in an electrode, there is a problem of poor durability of the electrode.

Figure 3:
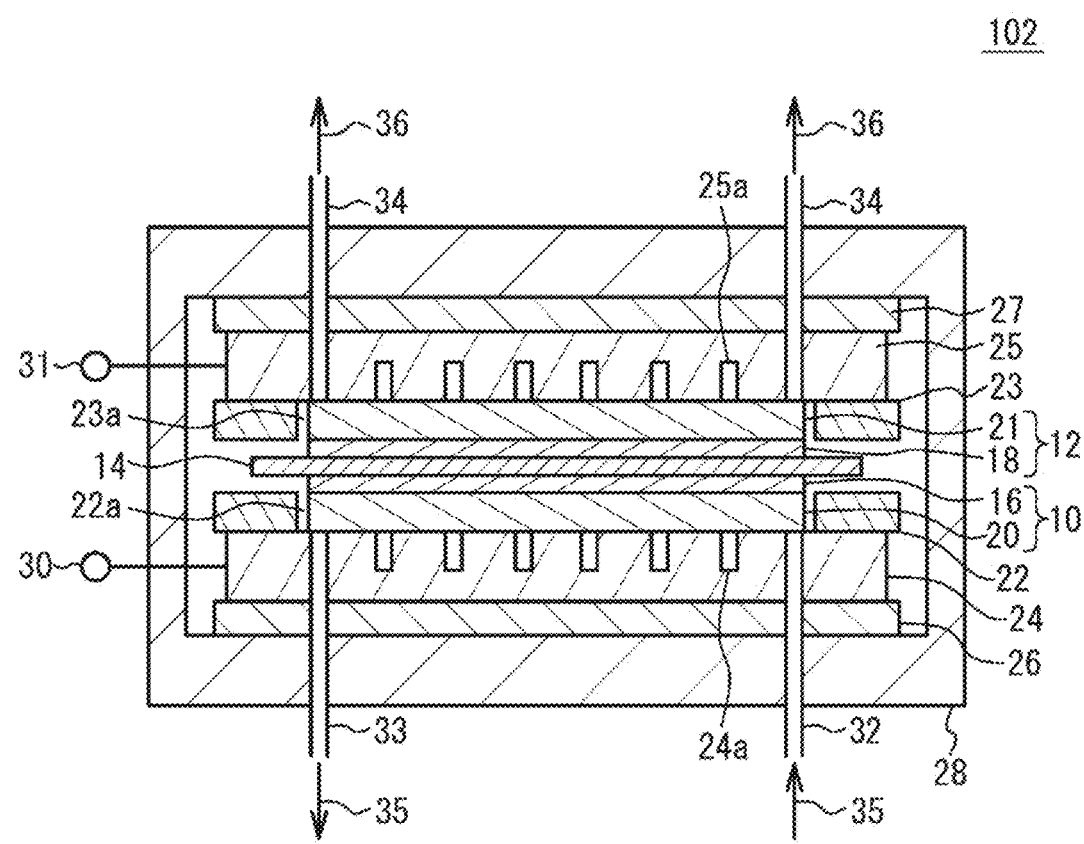
FIG. 3 is a cross-sectional view of a PEM type water electrolyzer according to Embodiment 3.

FIG. 3 is a cross-sectional view of a PEM type water electrolyzer according to Embodiment 3. As illustrated in FIG. 3, in a water electrolyzer 102, catalysts 16 and 18 are provided in a state in which they sandwich a solid polymer electrolyte membrane 14. The solid polymer electrolyte membrane 14 is a polymer membrane having ion (proton) conductivity, and is, for example, a fluorine-based polymer having a sulfonic acid group (for example, Nafion). The solid polymer electrolyte membrane 14 has a thickness of, for example, from 0.1 mm to 1 mm. The catalyst 16 is, for example, an alloy as described in Embodiment 1, and the catalyst 18 is, for example, a catalyst containing a base metal and bonded to the carbon fiber as described in Embodiment 2.

Gas diffusion layers 20 and 21 are provided in a state in which they sandwich the catalysts 16 and 18. The gas diffusion layer 20 supplies water to the electrode 10, and the gas diffusion layer 21 discharges the generated hydrogen gas. Furthermore, the gas diffusion layers 20 and 21 are electrically conductive. The gas diffusion layers 20 and 21 are, for example, carbon papers or carbon cloths. The gas diffusion layers 20 and 21 each have a thickness of, for example, from 0.01 mm to 1 mm. The gas diffusion layers 20 and 21 are provided in openings 22a and 23a formed in insulating gaskets 22 and 23, respectively.

The electrode 10 includes the catalyst 16 and the gas diffusion layer 20, and the electrode 12 includes the catalyst 18 and the gas diffusion layer 21. The catalyst(s) 16 and/or 18 may be supported on a surface of the electrolyte membrane 14, or may be supported on the gas diffusion layer(s) 20 and/or 21. A method of coating the surface of the electrolyte membrane 14 with the catalyst 16 and/or 18 is called a catalyst coated membrane (CCM) method. A method of coating the surface of the gas diffusion layer 20 and/or 21 with the catalyst 16 and/or 18 is called a catalyst coated electrode (CCE) method.

Current collectors 24 and 25 are provided in a state in which they sandwich the gas diffusion layers 20 and 21. The current collectors 24 and 25 supply current to the electrodes 10 and 12 through the gas diffusion layers 20 and 21, respectively. The current collectors 24 and 25 supply current, and thus are accurately power feeders, but are referred to herein as current collectors according to common practice. Water channels 24a and 25a may be provided on surfaces of the current collectors 24 and 25. The current collectors 24 and 25 are conductors made of, for example, Ti. The insulating gaskets 26 and 27 are provided in a state in which they sandwich the current collectors 24 and 25, and a housing 28 is provided in a state in which it sandwiches the gaskets 26 and 27.

Terminals 30 and 31 are electrically connected to the current collectors 24 and 25, respectively. When a voltage which makes the terminal 30 positive with respect to the terminal 31 is applied between the terminals 30 and 31, hydrogen gas 36 is generated at the electrode 12. An introduction channel 32 and a discharge channel 33 are provided in a state in which they pass through the housing 28, the gasket 26, and the current collector 24. Water 35 is introduced into the water channel 24a through the introduction channel 32, and discharged from the water channel 24a through the discharge channel 33. A discharge channel 34 is provided in a state in which it passes through the housing 28, the gasket 27, and the current collector 25. The hydrogen gas 36 is discharged from the water channel 25a through the discharge channel 34.

As long as the water electrolyzer 102 includes the anode catalyst 16, the cathode catalyst 18, and the solid polymer electrolyte membrane 14, other configurations can be appropriately designed. The use of the electrodes of Embodiments 1 and 2 in the PEM type water electrolyzer 102 can improve the durability of the electrodes 10 and 12 even when a base metal is used. As a result, it is possible to provide the water electrolyzer 102 which is inexpensive and obtains durability immediately. The electrode of Embodiment 1 or 2 may be used as at least one of the electrodes 10 and 12.

Although the catalysts 16 and 18 may be placed by using either the CCM method or the CCE method, it is preferable to use the CCM method when the catalyst of Embodiment 1 is used for the anode and to use the CCE method when the catalyst of Embodiment 2 is used for the cathode. This makes it possible to reduce contact electrical resistance between the electrolyte membrane 14 and the electrodes 10 and 12.

EXAMPLES

As an example, a PEM type water electrolyzer was prepared.

(Anode)

A quinary HEA wire of a high entropy alloy (HEA) containing Mn, Co, Ni, Cr, and Fe as constituent elements was provided. The atomic composition proportions of Mn, Co, Ni, Cr and Fe are each about 20 atom %. Further, a senary HEA wire containing Mo, Mn, Co, Ni, Cr, and Fe as constituent elements was provided. The atomic composition proportions of Mo, Mn, Co, Ni, Cr and Fe are each about 16.7 atom %. The HEA wire was pulverized in a planetary ball mill. A rotation speed of the planetary ball mill is 600 rpm and a pulverization time is 3 hours. The pulverized HEA and carbon black CB were mixed in a weight ratio of 1:1, and the HEA was physically pressure-bonded to CB in the planetary ball mill. As the carbon black, Vulcan XC72R available from Cabot Corporation, KETJENBLACK EC600JD available from Lion Specialty Chemicals Co., Ltd., or 05-1530 available from Sigma-Aldrich Co. LLC was used. Other carbon blacks may be used. The rotation speed of the planetary ball mill is 600 rpm and the pulverization time is 25 hours. Thus, a mixture HEA-CB of HEA and CB is generated. HEA-CB (30 mg) was dispersed in 0.6 ml of 1-propanol/water mixture (1-PrOH:$H_2O$=4.56:0.55 (weight ratio)). Nafion (Nafion 115) was added, and sonication was performed. A concentration of Nafion is 5 wt. %, and C:Nafion is 1:0.8 (weight ratio). A solution containing HEA-CB and Nafion was applied to the electrolyte membrane 14 (CCM method). The electrolyte membrane 14 is Nafion. As a result, HEA is supported on CB, and CB is supported on the electrolyte membrane 14.

Figure 4:
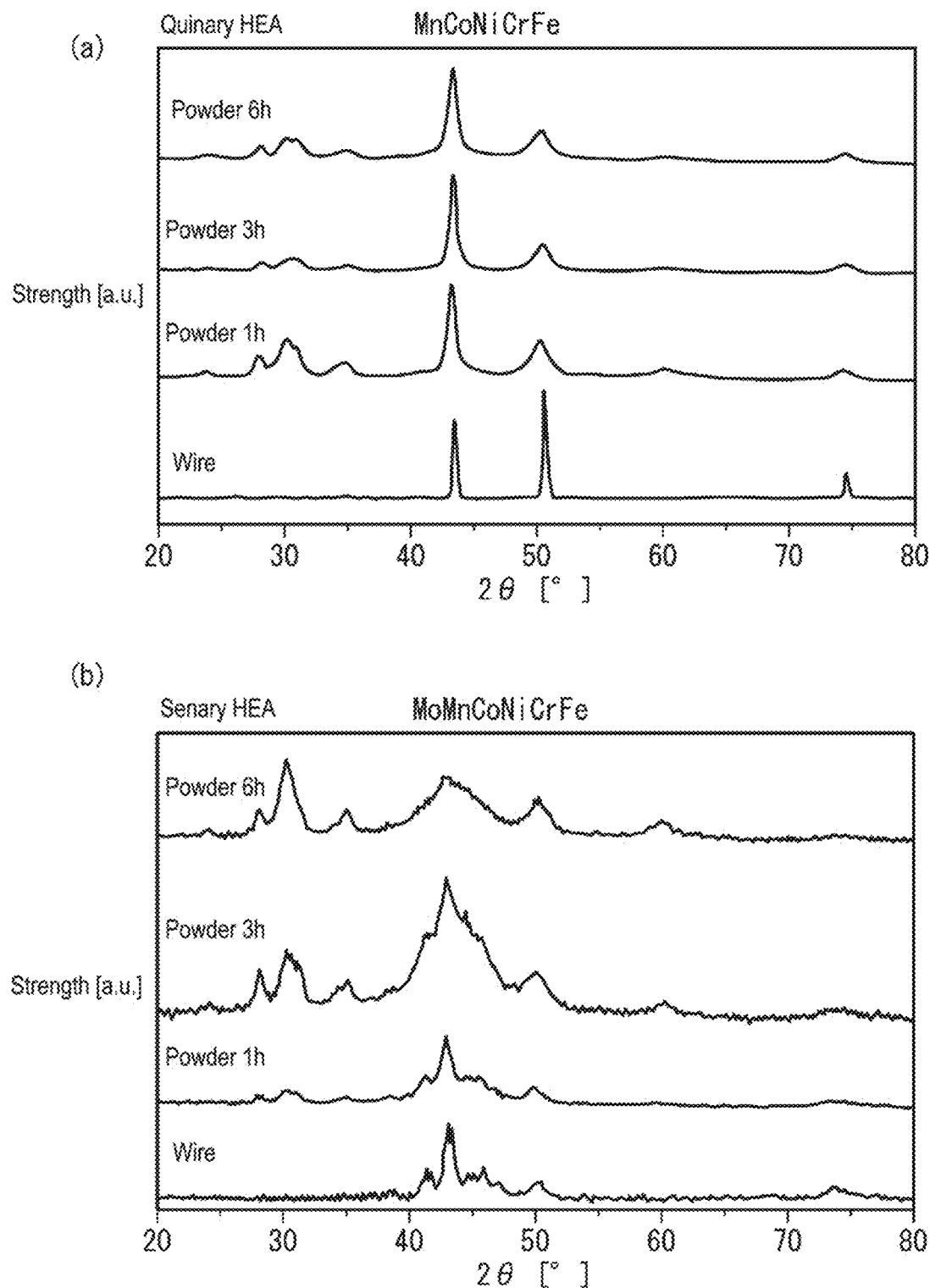
FIGS. 4A and 4B are diagrams illustrating X-ray diffraction patterns of a quinary HEA and a senary HEA in an example.

FIGS. 4A and 4B are diagrams illustrating X-ray diffraction (XRD) patterns of the quinary HEA and the senary HEA in the example. FIGS. 4A and 4B illustrate the XRD patterns of the HEA wire and the HEA powder after pulverization. The 1 h, 3 h and 6 h indicate pulverization times for HEA (without CB). A peak at 2θ of from 43° to 52° indicates an FCC crystal structure.

As illustrated in FIG. 4A, the quinary HEA wire has an FCC crystal structure. The HEA powders obtained by pulverizing the HEA wire have an FCC crystal structure although their peak is broader than that of the HEA wire. This indicates that the quinary HEA powders are all solid solutions of quinary base metals and that high entropy alloys are formed. The FCC crystal structure is maintained even after pulverization for 6 hours. A peak at 2θ of from 24° to 37° is a peak of zirconia. Balls of the ball mill are made of zirconia, and it is considered that zirconia is mixed in the HEA powder as an impurity. It is considered that the longer the pulverization time, the greater the surface area of the HEA.

As illustrated in FIG. 4B, the senary HEA wire has an FCC crystal structure. The HEA powders obtained by pulverizing the HEA wire have an FCC crystal structure although their peak is broader as the pulverization time is longer. This indicates that the senary HEA powders are all high entropy alloys. Longer pulverization times result in more zirconia.

Figure 5:
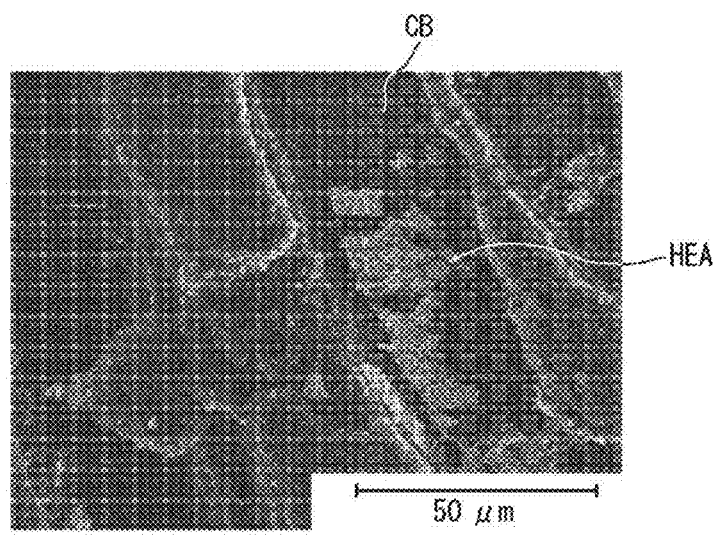
FIG. 5 is a SEM image of the quinary HEA supported on carbon black in the example.

FIG. 5 is a scanning electron microscope (SEM) image of the quinary HEA supported on carbon black in the example. As illustrated in FIG. 5, HEA is supported on carbon black CB. A particle diameter of HEA is from about 1 μm to about 10 μm.

(Cathode)

As illustrated in FIG. 1A, 1.5 mM $NiCl_2 \cdot H_2O$ and 1.5 mM $Na_2MoO_4 \cdot 2H_2O$ are dissolved in 30 ml of water to prepare the aqueous solution 54. Carbon paper (2 cm×2 cm) (TGP-H-090, available from Toray Industries, Inc.) is immersed in the aqueous solution 54. Hydrothermal synthesis treatment is carried out at a temperature of 150° C. for 6 hours. By drying, a carbon paper impregnated with $NiMoO_4$ as illustrated in FIG. 1B is formed. The carbon paper impregnated with $NiMoO_4$, alone, may provide insufficient NiMo. In this case, a $NiMoO_4$ solution that has been prepared in advance or that is not attached onto the carbon paper in the aqueous solution 54 is placed on the carbon paper. Thus, an amount of NiMo alloy was adjusted. The amount of the $NiMoO_4$ placed later is, for example, from 1 ml to 10 ml per 4 $cm^2$ of an area of the carbon paper. As illustrated in FIG. 1C, thermal treatment is performed at a temperature of 950° C. for 20 minutes in a mixed atmosphere of Ar gas and $H_2$ gas in the tubular furnace 56. As a result, $NiMoO_4$ is reduced, and a NiMo alloy supported on a carbon paper as illustrated in FIG. 1D is formed. A solution containing a NiMo alloy and Nafion (NIMO: Nafion=1:0.22 (weight ratio)) was applied to the gas diffusion layer 21 (CCE method).

Figure 6:
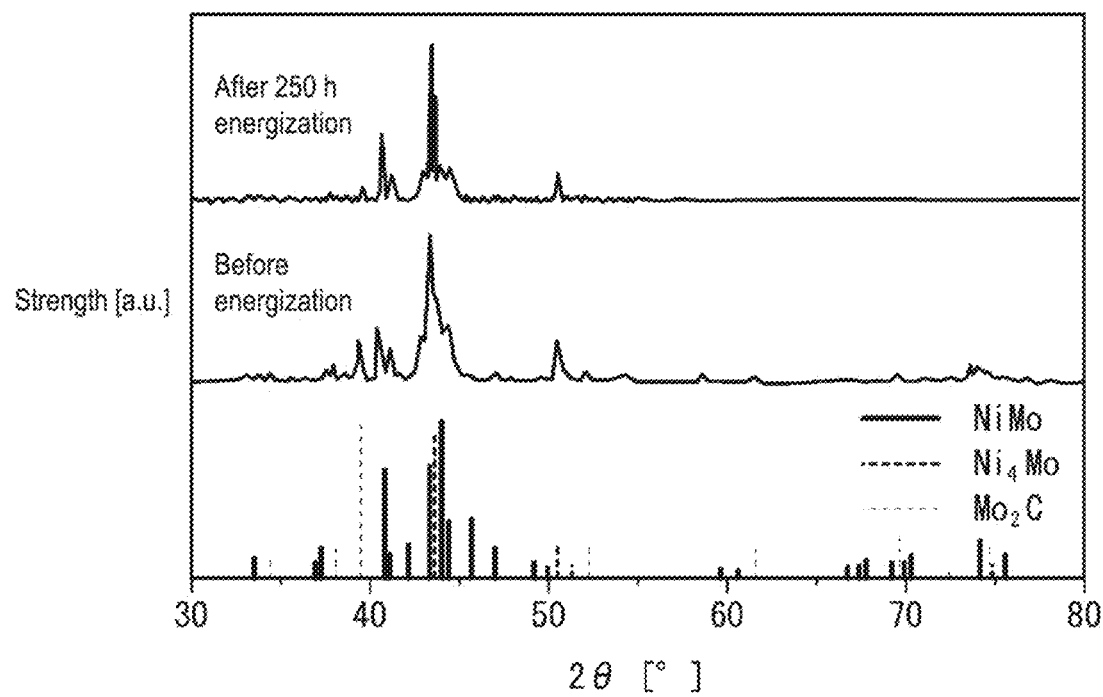
FIG. 6 is a diagram illustrating an X-ray diffraction pattern of the NiMo alloy in the example.

FIG. 6 is a diagram illustrating an X-ray diffraction pattern of the NiMo alloy in the example. As illustrated in FIG. 6, the NiMo alloy before energization contains NiMo and $Ni_4Mo$. A proportion of NiMo is greater than a proportion of $Ni_4Mo$. The alloy contains also some $Mo_2C$. As described above, at least a part of elements of NiMo, i.e., Mo, is chemically bonded to carbon of the carbon fiber 50. The ratio of Ni to Mo in the prepared NiMo alloy is Ni:Mo=1:1.5 (weight ratio) and Ni:Mo=1.09:1 (atomic ratio).

Figure 7:
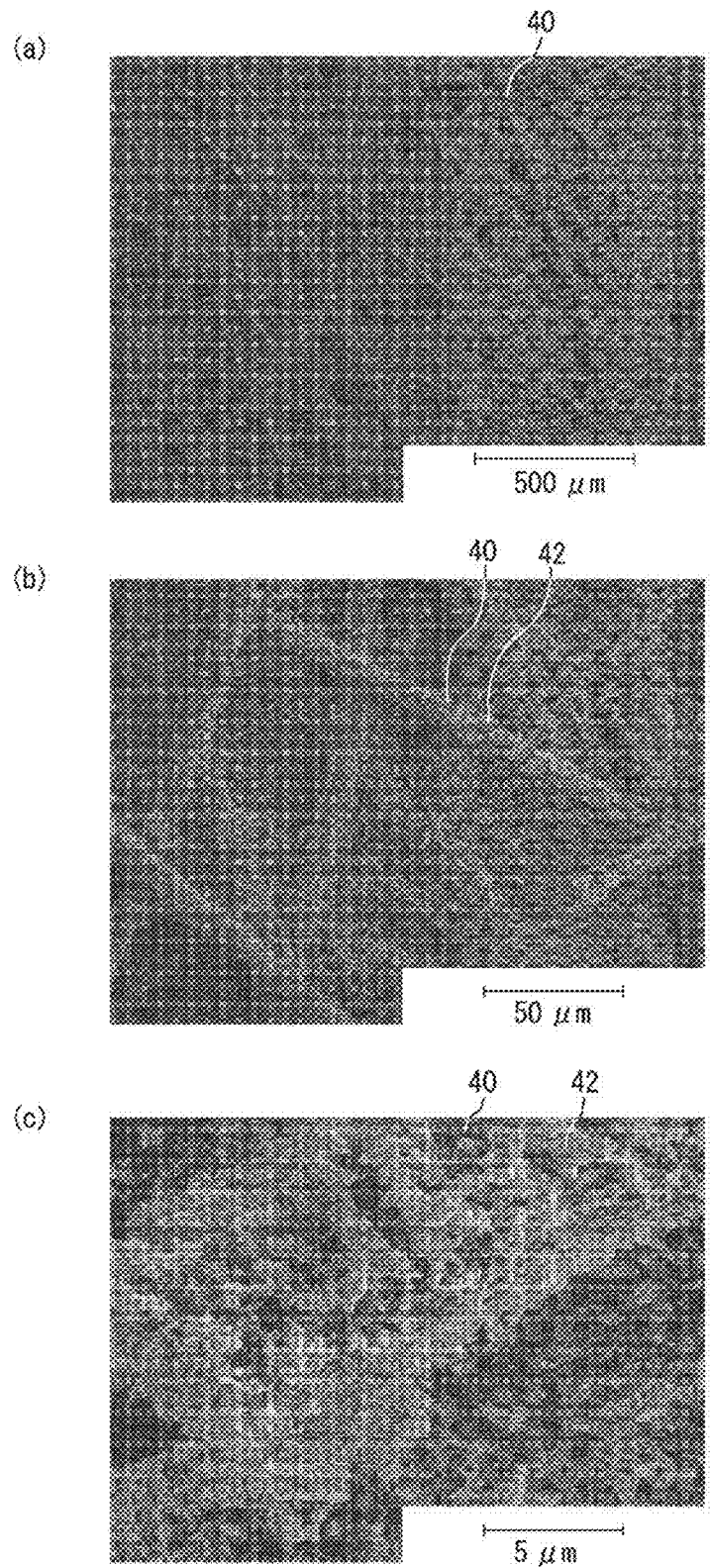
FIGS. 7A to 7C are SEM images of the NiMo alloy supported on a carbon fiber in the example.

FIGS. 7A to 7C are SEM images of the NiMo alloy supported on a carbon fiber in the example. As illustrated in FIG. 7A, the carbon paper is provided with a plurality of carbon fibers 40 in a net shape. A diameter of the carbon fibers 40 is several micrometers. As illustrated in FIG. 7B, the NiMo alloy 42 is supported in a state in which it surrounds each of the carbon fibers 40. As illustrated in FIG. 7C, the NiMo alloy 42 is directly bonded to the carbon fibers 40 and is directly grown from the carbon fibers 40. The NiMo alloy 42 is a porous body. Sizes of pores and ligaments of the NiMo alloy 42 are from 0.1 μm to 3 μm.

(Water Electrolysis Cell)

The electrolyte membrane 14 is sandwiched between the gas diffusion layers 20 and 21. The catalysts 16 and 18 are formed by the CCM method or the CCE method. The electrolyte membrane 14 and the gas diffusion layers 20 and 21 are pressed using a hot press at a temperature of 130° C. and a 250-Kg load for 3 minutes. The gas diffusion layers 20 and 21 are sandwiched between the current collectors 24 and 25 and the gaskets 26 and 27. A water electrolysis cell as illustrated in FIG. 3 was prepared by sandwiching the gaskets 26 and 27 between plates of the housing 28 and tightening them at about 4 N.

The following four cells were prepared.

Cell A
   Cathode catalyst: Pt/C, anode catalyst: $IrO_2$

Cell B
   Cathode catalyst: NiMo alloy simple substance, anode catalyst: $IrO_2$ Cell C
   Cathode catalyst: NiMo alloy, anode catalyst: $IrO_2$ Cell D
   Cathode catalyst: Pt/C, anode catalyst: quinary HEA Cell E
    Cathode catalyst: Pt/C, anode catalyst: senary HEA
Cell F
    Cathode catalyst: NiMo alloy, anode catalyst: quinary HEA
Weight Density Per Unit Area
    Pt/C: 1 mg/cm$^2$
    IrO$_2$: 1 mg/cm$^2$
    NiMo alloy: 3 mg/cm$^2$
    Quinary HEA: 3 mg/cm$^2$
    Senary HEA: 3 mg/cm$^2$
Other Materials
    Electrolyte membrane 14: Nafion (registered trademark) 115 or 117, available from Merck
    Gas diffusion layers 20 and 21: carbon paper TGP-H-090, available from Toray Industries, Inc.

The cell A is a comparative example in which noble metals are used as both the cathode catalyst and the anode catalyst. In the cell B, a porous NiMo alloy is pressed against and placed on the gas diffusion layer 21, and the cell B corresponds to a comparative example. In the cell B, the NiMo alloy and the carbon fibers in the gas diffusion layer 21 are only physically bonded, and are not chemically bonded. The cell C uses the NiMo alloy of the example in the cathode. The cells D and E use the quinary HEA and senary HEA of the example in the anode. The cell F uses the NiMo alloy of the example in the cathode and the quinary HEA of the example in the anode.

For the cells A, B and C, water electrolysis cells having an active area of 2 cm×2 cm were prepared, and their current-voltage characteristics were measured. The measurement conditions were a cell temperature of 80° C. and a water flow rate of 5 ml/min, and the current-voltage characteristics were measured after aging at a current density of 4 A/cm$^2$ for 25 hours.

Figure 8:
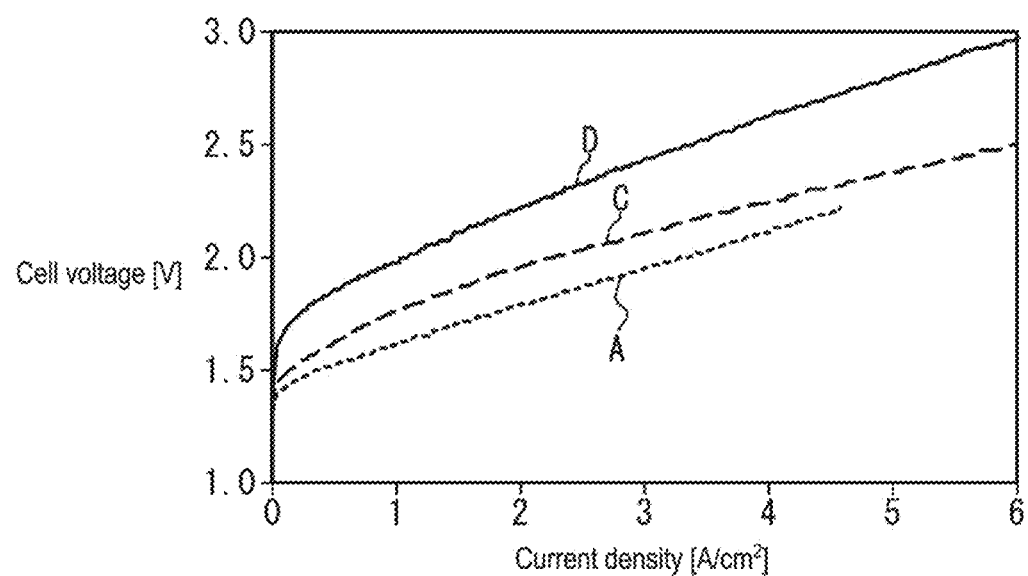
FIG. 8 is a diagram illustrating current-voltage characteristics of cells A, C and D.

FIG. 8 is a diagram illustrating the current-voltage characteristics of the cells A, C and D. The horizontal axis represents current density, and the vertical axis represents cell voltage. As illustrated in FIG. 8, the cell voltage of the cell C is substantially the same as that of the cell A which is the comparative example, and the cell voltage of the cell D is slightly higher than that of the cell A. The cell voltage at a current density of 1 A/cm$^2$ is used as an indicator of the electrolytic characteristics. The lower the cell voltage, the higher the efficiency. The comparative example cell A using a noble metal has a cell voltage of 1.6 V at 1 A/cm$^2$. The cell C has a cell voltage of 1.75 V, which is almost the same as that of the cell A. The cell D has a cell voltage of 1.95 V, which is slightly higher than that of the cell A.

Figure 9:
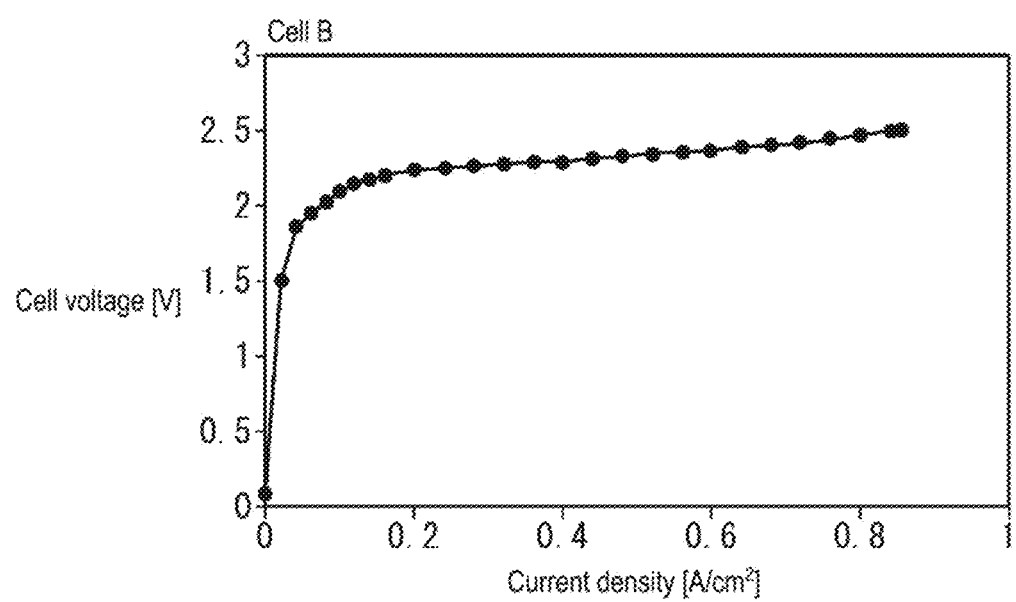
FIG. 9 is a diagram illustrating current-voltage characteristics of a cell B.

As a comparative example of the cell C, a water electrolysis cell having an active area of 4 cm$^2$ was prepared for the cell B, and the current-voltage characteristics were measured. The measurement conditions are a cell temperature of 25° C. and a water flow rate of 1 ml/min. FIG. 9 is a diagram illustrating the current-voltage characteristics of the cell B. As illustrated in FIG. 9, although the measurement conditions are different, the cell voltage of the cell B is much larger than that of the cell C. Thus, the cell B in which the NiMo alloy is physically pressed against the carbon fiber has low electrode performance. This is considered to be because contact resistance becomes high only by physical contact.

Figure 10:
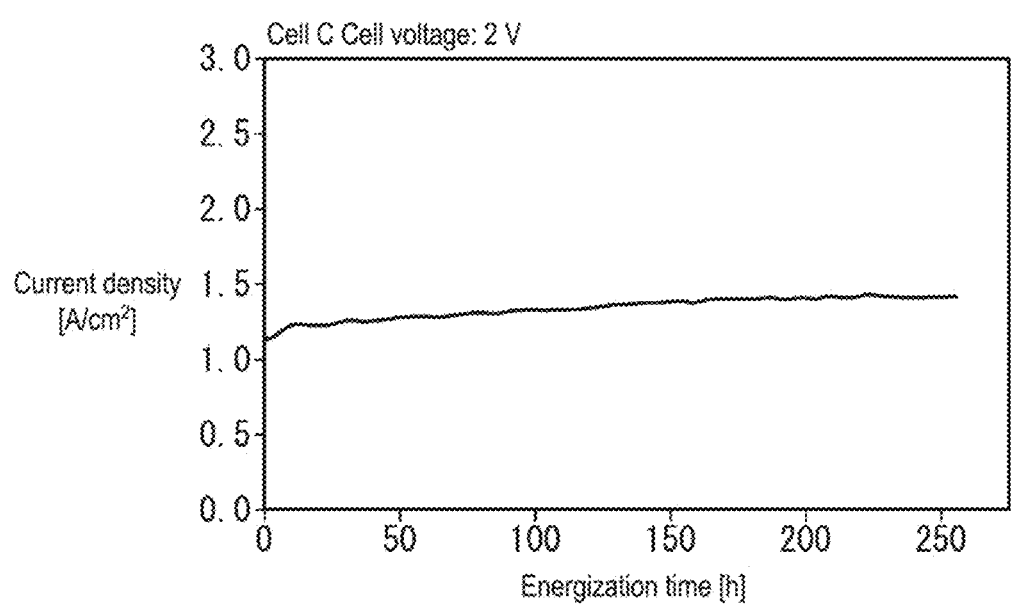
FIG. 10 is a diagram illustrating constant voltage characteristics in the cell C.

For the cell C, a change in current density over time was measured. The measurement conditions are a cell voltage of 2 V, a cell temperature of 80° C., and a water flow rate of 20 ml/min. FIG. 10 is a diagram illustrating constant voltage characteristics in the cell C. As illustrated in FIG. 10, even after an elapse of 250 hours, the current density does not decrease but rather increases. No decrease in current density was observed even after 250 hours. Under these conditions, the vicinity of the cathode catalyst is considered to be strongly acidic with a pH from 1 to 2. The fact that a decrease in current density was not observed even after 250 hours in such a strongly acidic environment indicates that the cell C has surprising durability. As is the case of after 250 h energization in FIG. 6, the crystal structure of the NiMo alloy is not deteriorated, from the XRD pattern.

Figure 11:
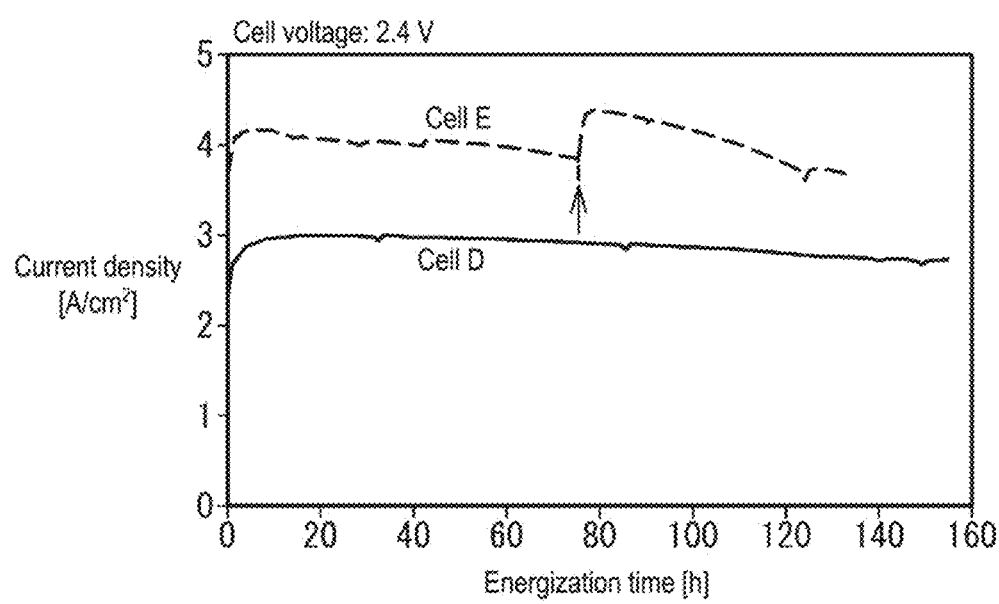
FIG. 11 is a diagram illustrating constant voltage characteristics in the cell D and a cell E.

For the cells D and E, the change in current density over time was measured. The measurement conditions are a cell voltage of 2.4 V, a cell temperature of 80° C., and a water flow rate of 5 ml/min. FIG. 11 is a diagram illustrating the constant voltage characteristics in the cells D and E. As illustrated in FIG. 11, the increase in current density is a general phenomenon in which the electrolyte membrane 14 swells and the electrolytic performance is improved. In the cell D, a maximum value of the current density is 3.0 A/cm$^2$, and the current density after energization for 150 hours is 2.72 A/cm$^2$. The current density after energization for 150 hours is 90.6% of the maximum current density.

In the cell E, the cell voltage was once turned off after about 75 hours, and the cell voltage was applied again. By turning off and applying the voltage, the current density is restored by 6%. The maximum value of the current density is 4.15 A/cm$^2$, and the current density after energization for 130 hours is 3.7 A/cm$^2$. The current density after energization for 150 hours is 89% of the maximum current density. For example, when the NiMo alloy used in the cathode catalyst of the cell C is used in the anode catalyst, the NiMo alloy dissolves within one minute. On the other hand, both the cells D and E have very high durability.

For the cells C, D and F, water electrolysis cells having an active area of 1 cm×1 cm were prepared, and their current-voltage characteristics were measured. The measurement conditions were a cell temperature of 80° C. and a water flow rate of 5 ml/min, and the current-voltage characteristics were measured after aging at a current density of 4 A/cm$^2$ for 25 hours.

Figure 12:
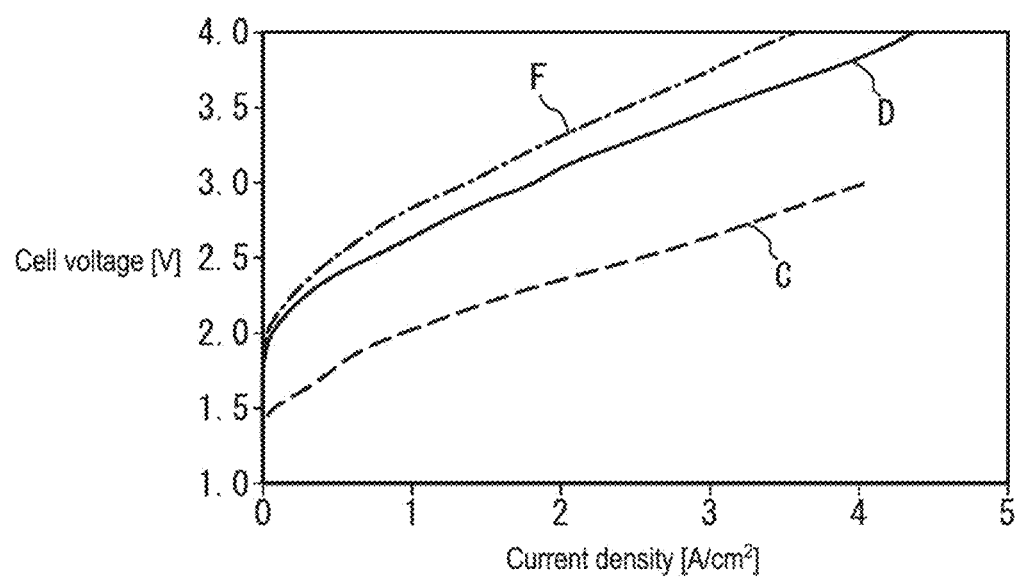
FIG. 12 is a diagram illustrating current-voltage characteristics of the cells C and D and a cell F.

FIG. 12 is a diagram illustrating the current-voltage characteristics of the cells C, D and F. As illustrated in FIG. 12, the active area is different from that in FIG. 8, and thus the cell voltages of the cells C and D are higher than those in FIG. 8. Comparisons in FIG. 12 are possible. The cell voltage at a current density of 1 A/cm$^2$ is 2.0 V for the cell C, 2.6 V for the cell D, and 2.8 V for the cell F. The cell voltage of the cell F is slightly higher than that of the cell D. Thus, water electrolysis can be conducted even in the cell F in which base metals are used as both the cathode catalyst and the anode catalyst.

Figure 13:
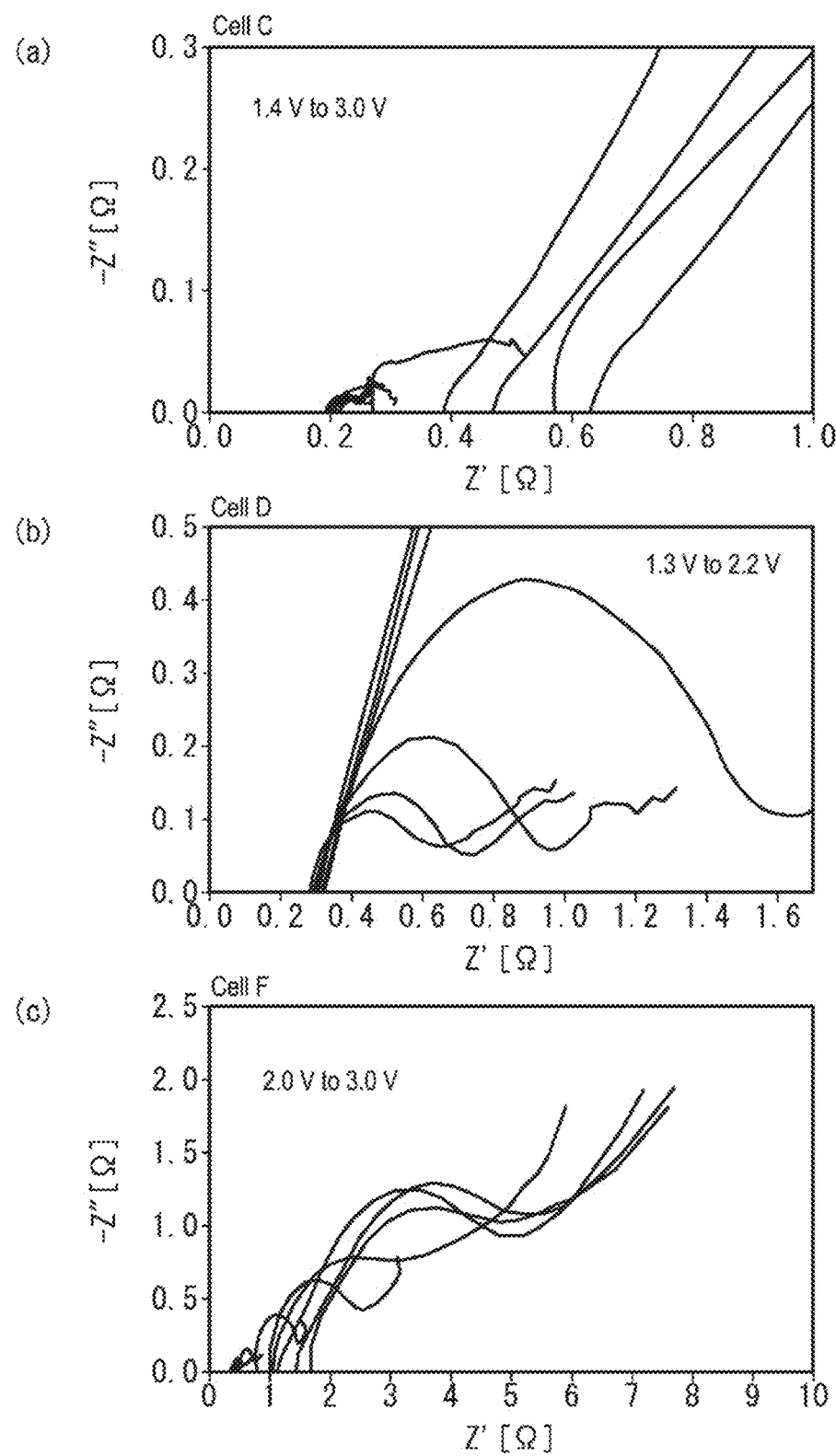
FIGS. 13A to 13C are diagrams illustrating impedance test results of the cells C, D, and F, respectively.

FIGS. 13A to 13C are diagrams illustrating impedance test results of the cells C, D, and F, respectively. The −Z" intercept in FIGS. 13A to 13C represents the contact resistance from the terminals 30 and 31 to the catalysts 16 and 18. As illustrated in FIG. 13A, in the cell C, the contact resistance is estimated to be from about 200 m2 to 650 mΩ. As illustrated in FIG. 13B, in the cell D, the contact resistance is estimated to be about 300 mΩ. As illustrated in FIG. 13C, in the cell F, the contact resistance is estimated to be from 350 mΩ to 1.6Ω. Thus, the contact resistance is high in the cells C, D and F. The contact resistance should be able to be reduced by conditions, for example, for cell preparation, and, if optimized, is considered to be able to improve the performance of the cells C, D and F to the same level as the cell A using a noble metal.

As described above, by using the cells C to F, the performance and durability of the electrode are improved, and the performance and durability of the water electrolyzer are improved.

Water electrolysis cells having an active area of 2 cm×2 cm were prepared, in which quinary to novenary high entropy alloys (HEAs) were used in the anode and/or cathode catalyst(s). The elements used in each of the HEAs are as follows:

Quinary HEA: Co, Cr, Mn, Ni, and Fe
Senary HEA: Co, Cr, Mn, Ni, Fe, and Mo
Septenary HEA: Co, Cr, Mn, Ni, Fe, Mo, and Nb
Octonary HEA: Co, Cr, Mn, Ni, Fe, Mo, Nb, and Zr
Novenary HEA: Co, Cr, Mn, Ni, Fe, Mo, Nb, Zr, and Ti Cells containing any of quinary to novenary HEAs as the anode catalyst and $IrO_2$ as the cathode catalyst were prepared. In addition, cells containing Pt/C as the anode catalyst and any of quinary to novenary HEAs as the cathode catalyst were produced. The current-voltage characteristics of these cells were measured. The measurement conditions were a cell temperature of 80° C. and a water flow rate of 5 ml/min, and the current-voltage characteristics were measured after aging at a current density of 4 A/cm² for 25 hours.

Figure 14:
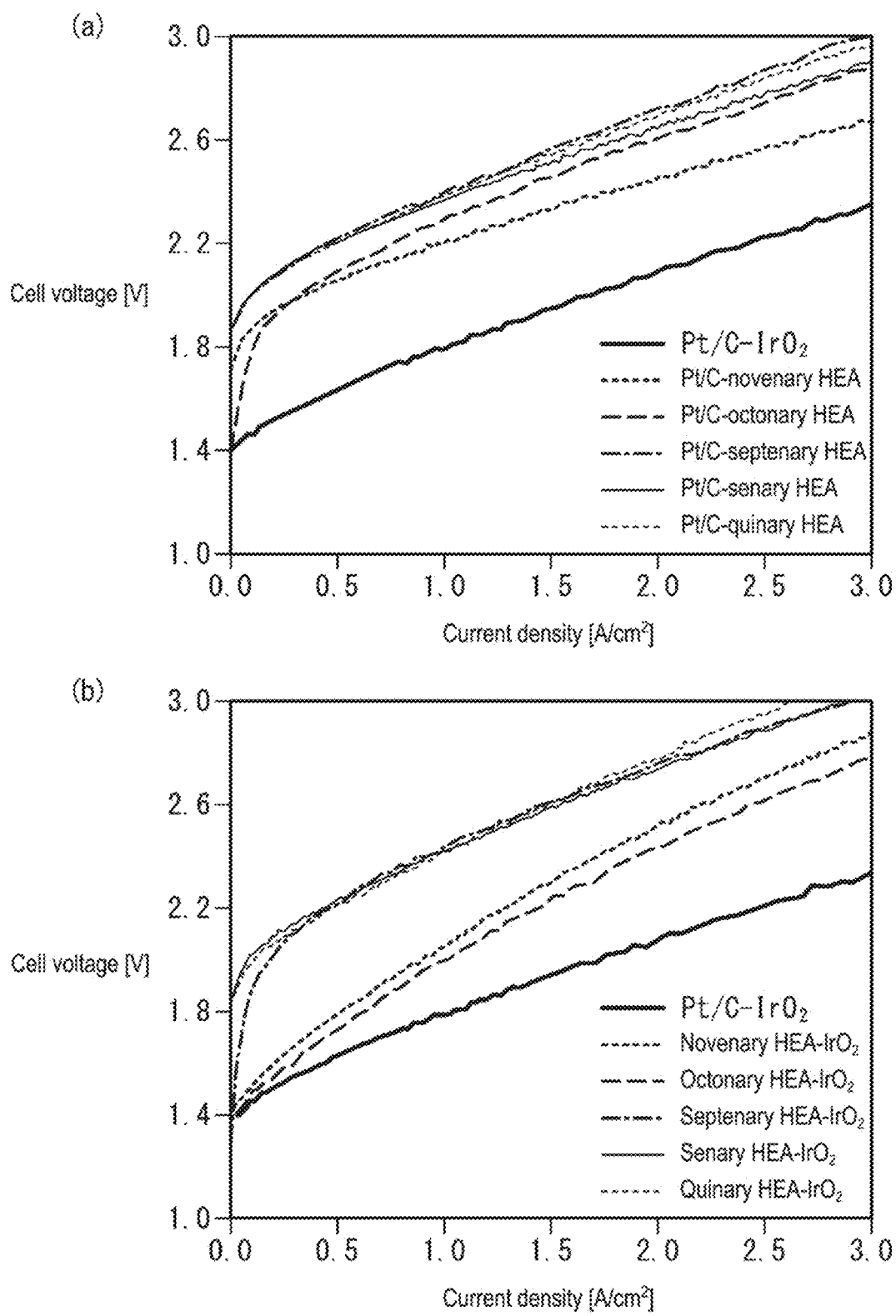
FIGS. 14A and 14B are diagrams illustrating current-voltage characteristics of cells using any of quinary to novenary HEAs in an anode or a cathode.

FIGS. 14A and 14B are diagrams illustrating the current-voltage characteristics of the cells using any of quinary to novenary HEAs in the anode or cathode. FIG. 14A is a diagram illustrating the current-voltage characteristics of Pt/C-quinary to novenary HEA cells using Pt/C in the cathode and any of quinary to novenary HEAs in the anode. As a comparative example, the current-voltage characteristics of a Pt/C-$IrO_2$ cell containing Pt/C in the cathode and $IrO_2$ in the anode are also illustrated. As illustrated in FIG. 14A, the Pt/C-quinary to novenary HEA cells have a cell voltage slightly higher than that of the Pt/C-$IrO_2$ cell. For example, the cell voltage at a current density of 1 A/cm² is 1.60 V for the Pt/C-$IrO_2$ cell, but, on the other hand, 2.20 V for the Pt/C-novenary HEA cell. As the number of elements increases from 5 to 9, the cell voltage decreases. In particular, in the cells using HEAs of eight or more elements, the cell voltage is low.

FIG. 14B is a diagram illustrating current-voltage characteristics of cells (quinary to novenary HEA-$IrO_2$) using any of quinary to novenary HEAs in the cathode and $IrO_2$ in the anode. As a comparative example, the current-voltage characteristics of a Pt/C-$IrO_2$ cell are also illustrated. As illustrated in FIG. 14B, the quinary to novenary HEA-$IrO_2$ cells have a cell voltage slightly higher than that of the Pt/C-$IrO_2$ cell. For example, the cell voltage at a current density of 1 A/cm² is 1.60 V for the Pt/C-$IrO_2$ cell, but, on the other hand, 2.06 V for the quinary to novenary HEA-$IrO_2$ cells. As the number of elements increases from 5 to 9, the cell voltage decreases. In particular, in the cells using HEAs of eight or more elements, the cell voltage is low.

Figure 15:
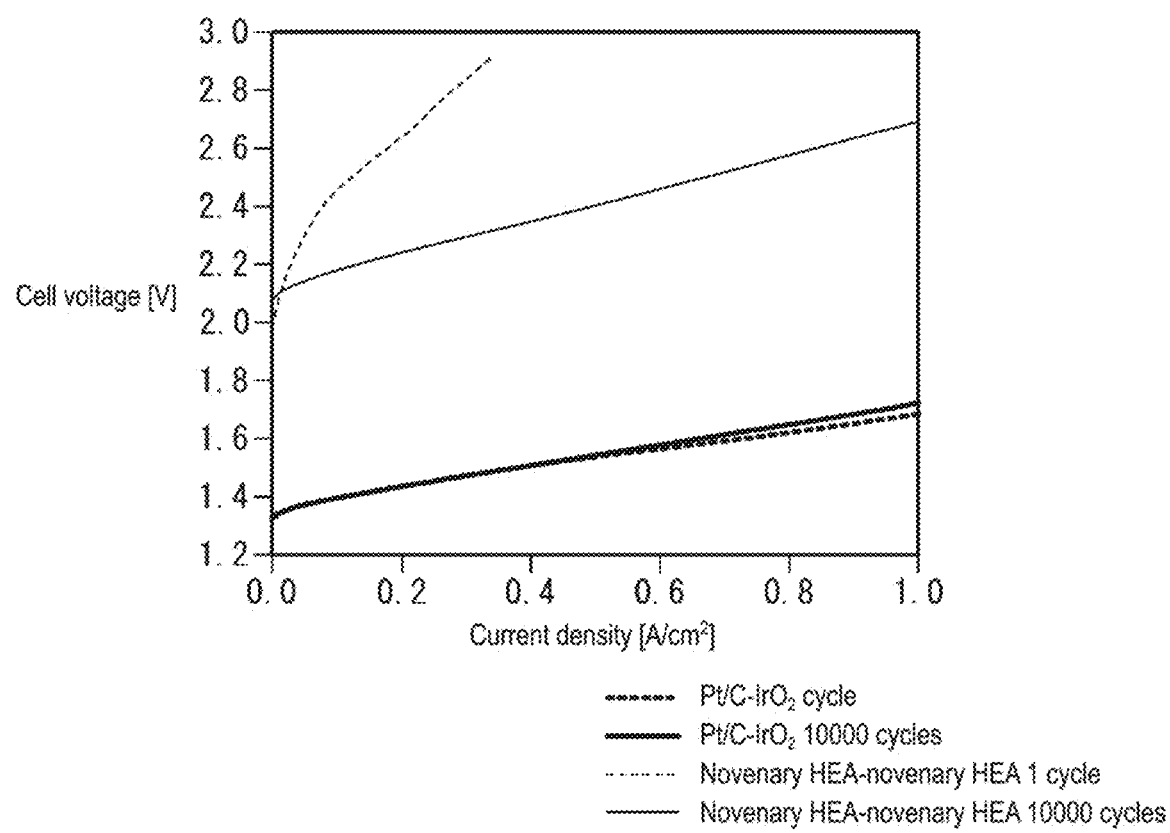
FIG. 15 is a diagram illustrating current-voltage characteristics of a cell using novenary HEAs in the anode and the cathode.

FIG. 15 is a diagram illustrating the current-voltage characteristics of a cell using novenary HEAs in the anode and the cathode. The novenary HEA-novenary HEA cell use novenary HEAs in both the anode and the cathode. As a comparative example, the current-voltage characteristics of the Pt/C-$IrO_2$ cell are illustrated. For each of the cells, the current-voltage characteristics at the first cycle and the current-voltage characteristics after 10,000 cycles of sweeping at a current density from 0 A/cm² to 1 A/cm² are illustrated. As illustrated in FIG. 15, the cell voltage of the novenary HEA-novenary HEA cell is higher than that of the Pt/C-$IrO_2$ cell. In the Pt/C-$IrO_2$ cell, the current-voltage characteristics after 10000 cycles are almost the same as those at the first cycle. In the novenary HEA-novenary HEA cell, the current-voltage characteristics after 10000 cycles are slightly higher than those at the first cycle.

Figure 16:
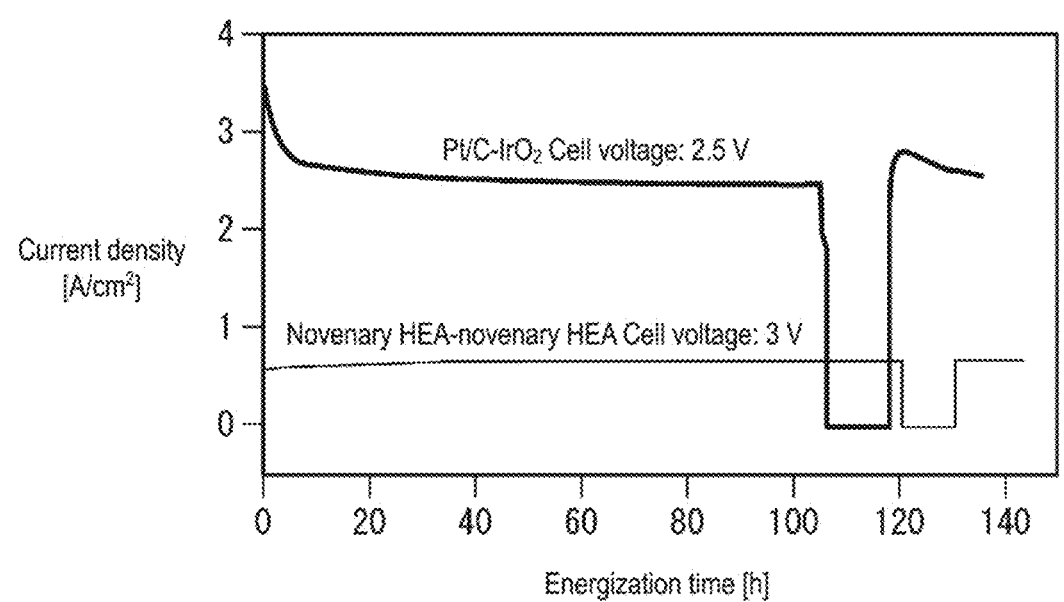
FIG. 16 is a diagram illustrating constant voltage characteristics in a novenary HEA-novenary HEA cell.

The change in current density over time was measured for the novenary HEA-novenary HEA cell. FIG. 16 is a diagram illustrating the constant voltage characteristics in the novenary HEA-novenary HEA cell. As a comparative example, the characteristics of the Pt/C-$IrO_2$ cell are illustrated. The cell voltage of the novenary HEA-novenary HEA cell is 3 V, and the cell voltage of the Pt/C-$IrO_2$ cell is 2.5 V. As illustrated in FIG. 16, in both the novenary HEA-novenary HEA cell and the Pt/C-$IrO_2$ cell, the current density hardly changes until the energization time reaches 130 h to 140 h. Even when the energization is stopped for about 10 hours in the middle of the energization and then resumed, the current density hardly changes.

The reaction at the anode of the water electrolyzer is OER and at the cathode is HER. An overvoltage is applied to the anode for the purpose of obtaining the desired current density for progression of OER, and the anode is exposed to a high potential, and the OER catalyst is oxidized and easily degraded. Therefore, if a catalyst having no oxidation resistance is used for the anode, the anode catalyst instantaneously dissolves upon energization of the water electrolyzer. Therefore, there is no practical catalyst other than $IrO_2$ as the catalyst of the anode of the PEM type water electrolyzer. As illustrated in FIGS. 11 and 16, a durable catalyst for OER can be realized by using HEA in the anode. When HEA is used as the anode catalyst, the cell voltage is higher than that of $IrO_2$, but HEA using a base metal is inexpensive and highly practical as compared with Ir. In the water electrolyzer, the cathode is oxidized when the current is stopped. When a catalyst having no oxidation resistance is used for the cathode, the cathode catalyst dissolves after the current is stopped. This is suppressed, for example, by continuously supplying a low current when the water electrolyzer is stopped, in an alkaline water electrolyzer in which a base metal is used as a catalyst. As illustrated in FIG. 16, due to the use of HEA in the cathode, the cathode is not deteriorated even when the energization is resumed after the energization is stopped.

The durability of the electrode can be improved by using, as a catalyst for an oxygen evolution reaction (OER) or a hydrogen evolution reaction (HER), an alloy including three or more base metal elements, in which the three or more base metal elements are nearly equal in atomic composition proportion, and form a solid solution.

A catalyst for HOR is used in an anode of a fuel cell. When hydrogen is generated from a hydrocarbon such as methanol or natural gas as a fuel gas for the fuel cell, carbon monoxide (CO) is contained in the hydrogen. For example, when Pt is used as a catalyst of the anode of the fuel cell, Pt is poisoned by CO. A Pt—Ru alloy is used as the anode catalyst for the purpose of enhancing the CO resistance, but, if the catalyst is used for a long period of time, the CO resistance decreases, for example, due to dissolution of Ru. Thus, the catalyst for HOR involves a problem which the catalyst for ORR does not involve. For this reason, the catalyst for ORR is usually not used as the HOR catalyst.

The durability of the electrode can be improved by using, as a catalyst for a hydrogen oxidation reaction (HOR) or a hydrogen evolution reaction (HER), an alloy including three or more base metal elements, in which the three or more base metal elements are nearly equal in atomic composition proportion, and form a solid solution. In particular, the durability of the anode can be improved by using the catalyst of Embodiment 1 in the anode of the fuel cell.

The three or more base metal elements are preferably at least three elements of Fe, Cu, Ni, Al, Pb, Zn, Sn, W, Mo, Ta, Mg, Co, Bi, Cd, Ti, Zr, Sb, Mn, Be, Cr, Ge, V, Ga, Hf, In, Nb, Re and Tl. The number of base metal elements is preferably 5 or more, and more preferably 6 or more. As illustrated in FIGS. 14A and 14B, the number of base metal elements is more preferably 8 or more.

Here, the phrase "a certain catalyst or alloy includes a plurality of certain base metal elements" means that the certain catalyst or alloy does not intentionally contain an element other than the plurality of certain base metal elements. That is, the certain catalyst or alloy may contain unavoidable elements other than the plurality of certain base metal elements. A total atomic composition rate of unavoidable non-metal elements such as oxygen, carbon and hydrogen in the certain catalyst or alloy is preferably Cat/2 or less, and more preferably Cat/5 or less, where the atomic composition proportion of the element having the smallest atomic composition proportion among the plurality of certain base metal elements is Cat. A total atomic composition proportion of unavoidable metal elements other than the plurality of certain base metal elements in the certain catalyst or alloy is preferably Cat/10 or less, and more preferably Cat/100 or less. A total composition proportion of unavoidable elements in the certain catalyst or alloy is preferably 10 atom % or less, and more preferably 1 atom % or less.

Although preferable embodiments of the present invention have been described above in detail, the present invention is not limited to those specific embodiments. Various modifications and changes can be made to the embodiments without departing from the scope and spirit of the present invention as described in the claims.

REFERENCE SIGNS LIST

- 10, 12 Electrode
- 11 Electrolyte
- 14 Electrolyte membrane
- 16, 18 Catalyst
- 20, 21 Gas diffusion layer
- 24, 25 Current collector
- 22, 23, 26, 27 Gasket
- 50 Carbon fiber
- 51 Oxide
- 52 Catalyst
- 54 Aqueous solution
- 57 Reducing gas

The invention claimed is:

1. An electrode comprising an alloy, as a catalyst for an oxygen evolution reaction, for a hydrogen evolution reaction, or for a hydrogen oxidation reaction, and carbon blacks or carbon fibers, the alloy including three or more base metal elements selected from Fe, Cu, Ni, Al, Pb, Zn, Sn, W, Mo, Ta, Mg, Co, Bi, Cd, Ti, Zr, Sb, Mn, Be, Cr, Ge, V, Ga, Hf, In, Nb, Re, and Tl, wherein the three or more base metal elements contain at least Zr, and the three or more base metal elements are nearly equal in atomic composition proportion and form a solid solution, and
wherein the three or more elements are supported on the carbon blacks or the carbon fibers.

2. The electrode according to claim 1, wherein the three or more base metal elements are eight or more base metal elements.

3. The electrode according to claim 1, wherein the three or more base metal elements include Co, Cr, Mn, Ni, Fe, Mo, Nb, and Zr.

4. The electrode according to claim 1, wherein the catalyst is a catalyst for an oxygen evolution reaction or for a hydrogen evolution reaction.

5. The electrode according to claim 1, wherein the catalyst is a catalyst for an oxygen evolution reaction.

6. The electrode according to claim 1, wherein the catalyst is a catalyst for a hydrogen oxidation reaction.

7. The electrode according to claim 1, wherein, when the highest and lowest atomic composition proportions among the three or more elements are designated Cmax and Cmin respectively, (Cmax−Cmin)/(Cmax+Cmin) is equal to or more than 0.2.

8. A water electrolyzer comprising:
an anode which is the electrode according to claim 4;
a cathode; and
a solid polymer electrolyte membrane provided between the anode and the cathode.

9. The water electrolyzer according to claim 8, wherein the cathode is an electrode including, as a catalyst for an oxygen evolution reaction, or for a hydrogen evolution reaction, an alloy including three or more base metal elements selected from Fe, Cu, Ni, Al, Pb, Zn, Sn, W, Mo, Ta, Mg, Co, Bi, Cd, Ti, Zr, Sb, Mn, Be, Cr, Ge, V, Ga, Hf, In, Nb, Re, and Tl, wherein the three or more elements contain at least Zr, and the three or more base metal elements are nearly equal in atomic composition proportion and form a solid solution.

10. The water electrolyzer according to claim 8, wherein the cathode is an electrode including a carbon fiber, and a catalyst including a base metal, at least a part of elements of the catalyst being chemically bonded to the carbon fiber.

11. The water electrolyzer according to claim 8, wherein the anode is an electrode comprising, as a catalyst, an alloy including at least eight elements of Fe, Cu, Ni, Al, Pb, Zn, Sn, W, Mo, Ta, Mg, Co, Bi, Cd, Ti, Zr, Sb, Mn, Be, Cr, Ge, V, Ga, Hf, In, Nb, Re and Tl, wherein the eight or more elements contain at least Co, Cr, Mn, Ni, Fe, Mo, Nb and Zr, and the eight or more base metal elements are nearly equal in atomic composition proportion and form a solid solution.

12. A fuel cell comprising:
an anode which is the electrode according to claim 6;
a cathode; and
an electrolyte membrane provided between the anode and the cathode.

* * * * *